Feb. 14, 1939.  F. G. KUGEL  2,146,959
PIPE CUTTER
Filed June 11, 1937  4 Sheets-Sheet 1
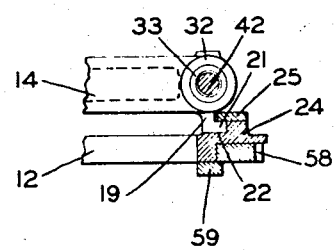
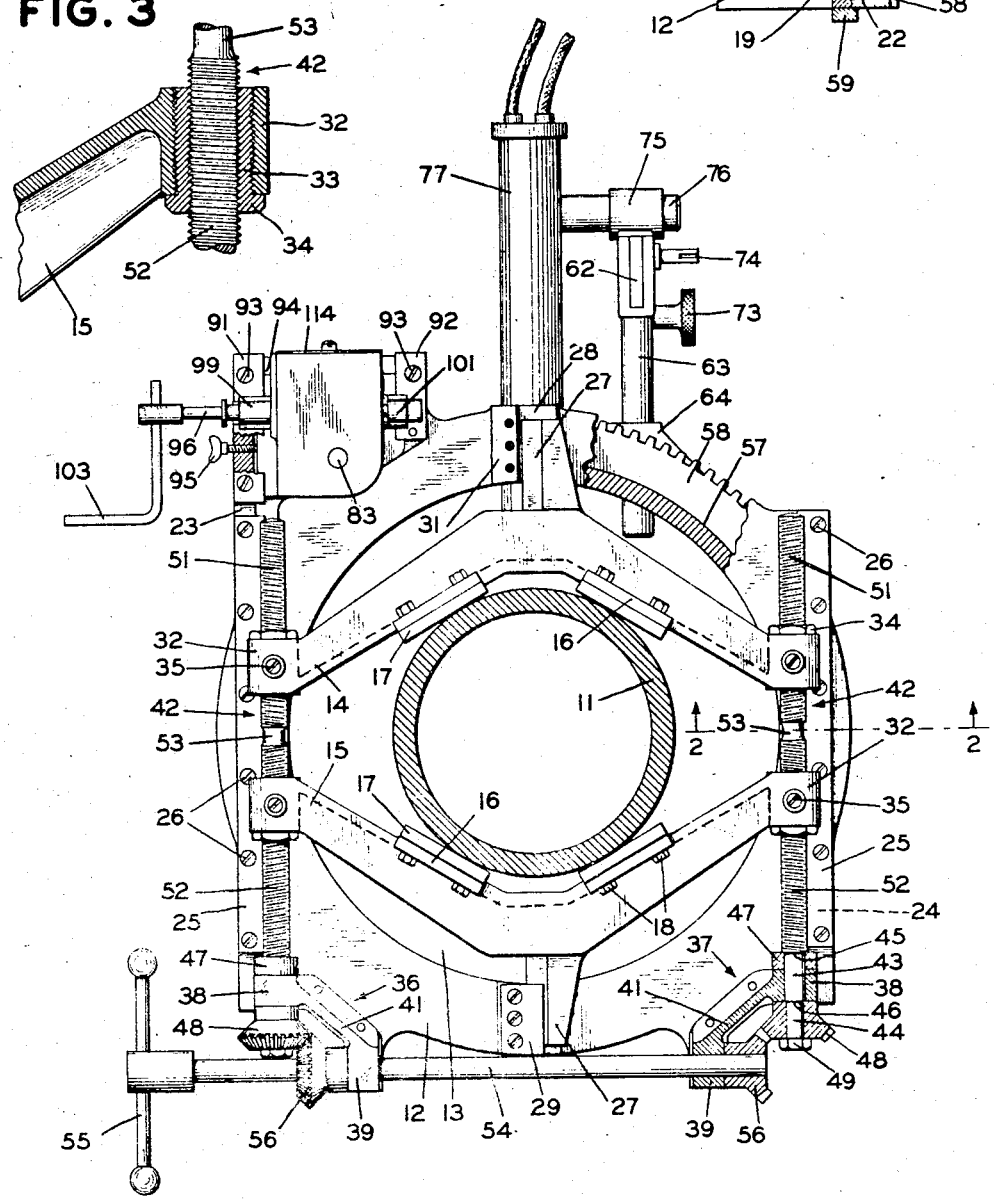
INVENTOR
FREDERICK G. KUGEL
BY
Virgil F. Davies
ATTORNEY Feb. 14, 1939. F. G. KUGEL 2,146,959
PIPE CUTTER
Filed June 11, 1937 4 Sheets-Sheet 2

INVENTOR
FREDERICK G. KUGEL
BY
Virgil F. Darrow
ATTORNEY

Feb. 14, 1939.   F. G. KUGEL   2,146,959
PIPE CUTTER
Filed June 11, 1937   4 Sheets-Sheet 3

INVENTOR
FREDERICK G. KUGEL
BY
Virgil F. Davies
ATTORNEY

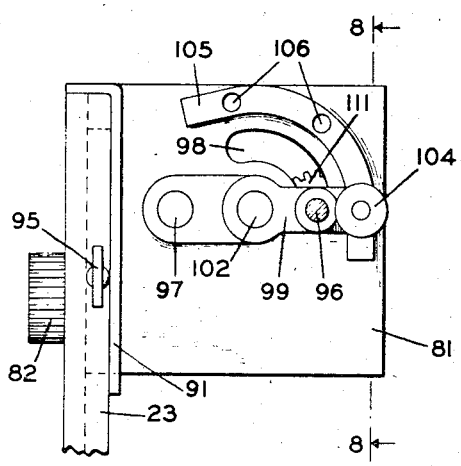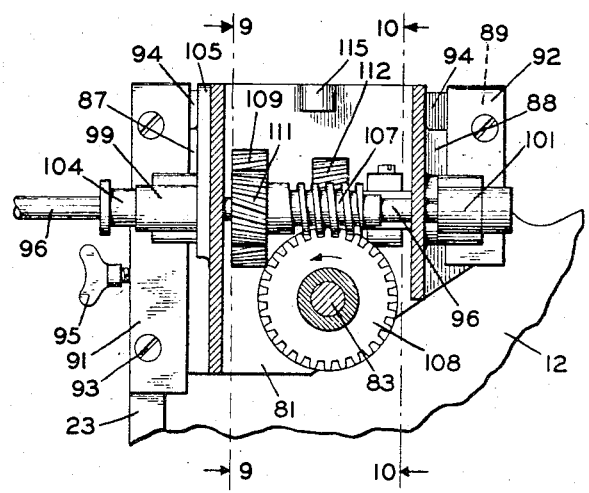

Patented Feb. 14, 1939

2,146,959

UNITED STATES PATENT OFFICE 2,146,959

PIPE CUTTER

Frederick G. Kugel, Bloomfield, N. J., assignor to The M. W. Kellogg Co., New York, N. Y., a corporation of Delaware Application June 11, 1937, Serial No. 147,636

4 Claims. (Cl. 266—23)

This invention relates to pipe cutting machines and has particular reference to a portable device for performing various operations on pipe, such as cutting, bevelling, shaping, drilling or scribing.

To those well skilled in the art of pipe manufacture or pipe-line construction the problem of suitably preparing pipe-ends for joining, or cutting pipe into desirable lengths, is well known.

During the course of pipe line construction work at points remote from the place of pipe manufacture, it is often necessary to shorten, shape, or remove sections of pipe in order that the work may be properly carried on. In some cases it may be necessary to drill or slot the pipe walls or the pipe flange, or to accurately grind or buff the ends of the pipe. Heretofore, much of such work has been performed by hand with a consequent appreciable loss of time, and an increase in labor and costs. Hence, it is a primary object of this invention to provide a device for accurately and expeditiously performing the above-mentioned operations.

Since much of this work must be done in the field, where the pipes are often cut and welded, or otherwise joined, as they are laid, the above-mentioned operations are best carried on by a machine embodying the advantages of portability and rapid, accurate operation, without sacrificing the features of simplicity and sturdiness made necessary by reason of the constant and rough handling incident to this type of work.

It is a further and more specific object of this invention to provide means adapted to be supported by a section of pipe, for carrying a tool, such as a cutting torch, grinder, drill, or the like, around the piece of pipe in a path concentric therewith.

Another object is to provide adjustable means for moving the tool longitudinally and radially relative to the pipe, and for positioning the tool at various angles to the pipe surface.

Another object is to provide a portable machine embodying a carriage or framework adapted to encircle and clasp the pipe to be worked upon and support the tool in its various operating positions.

Still another object is to provide a pipe-cutting machine with an adjustable clamping means adapted to receive various sizes of pipe.

Another object is to provide a means for driving the tool carrier around the pipe at a variable rate of speed.

Another object is to provide means for accurately measuring the angle through which the tool carrier is turned so that various operations may be performed at predetermined points about the pipe's surface.

These and other objects are effected by my invention as will be apparent from the following description and claims taken in connection with the accompanying drawings, in which:

Fig. 1 is a front elevation view showing the machine mounted on a piece of pipe with a gas cutting torch mounted in the tool post.

Fig. 2 is a fragmentary sectional view showing the construction of the ends of the pipe gripping jaws and the guideway therefor.

Fig. 3 is a fragmentary sectional view showing the means for separately adjusting each jaw end on its feed-screw.

Fig. 7 is a side view of the transmission mechanism as viewed along the line 7—7 of Fig. 6.

Fig. 8 is a front sectional view of the same taken along the line 8—8 of Fig. 7.

Fig. 9 is a side sectional view of the transmission mechanism taken along the line 9—9 of Fig. 8; and Fig. 10 is a side sectional view of the same taken along the line 10—10 of Fig. 8.

Figure 4:
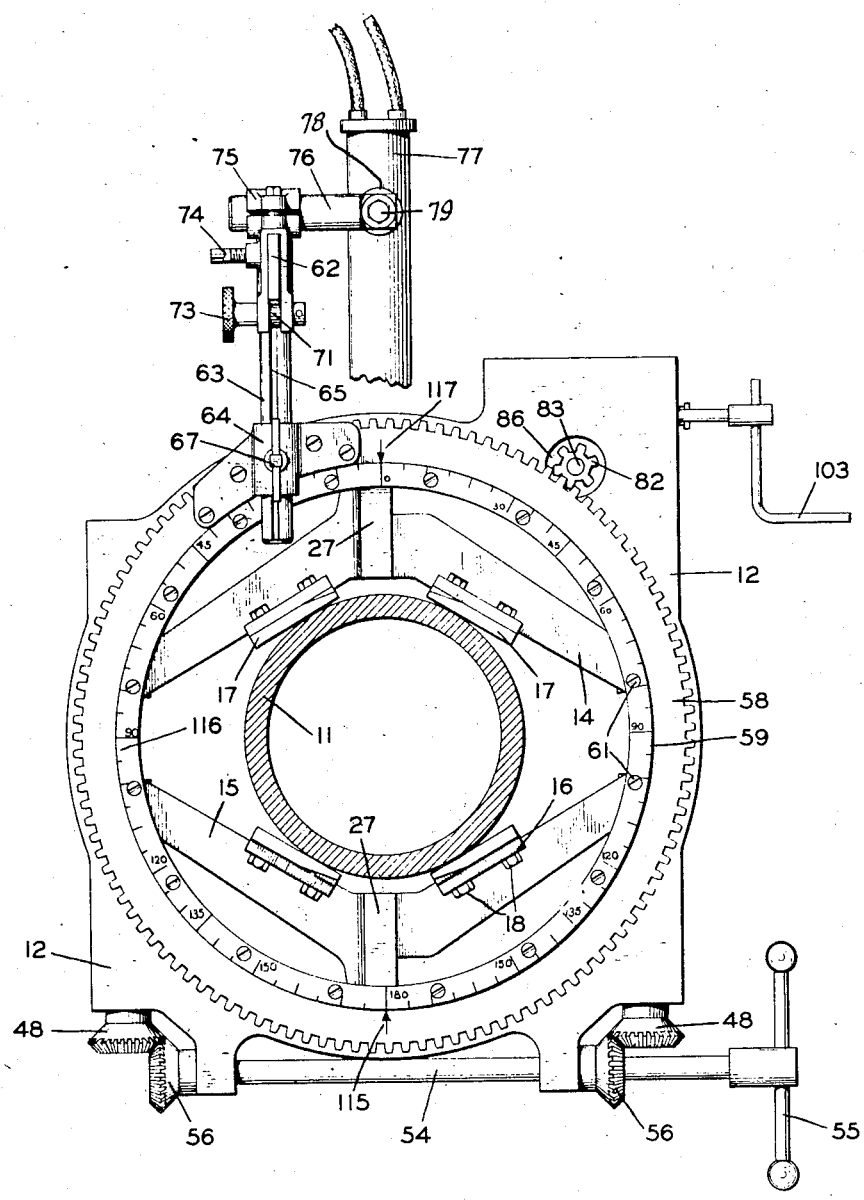
Fig. 4 is a rear elevation view showing clearly the shape of the supporting frame and the means for measuring the angle of rotation of the tool carrier.
Figure 6:
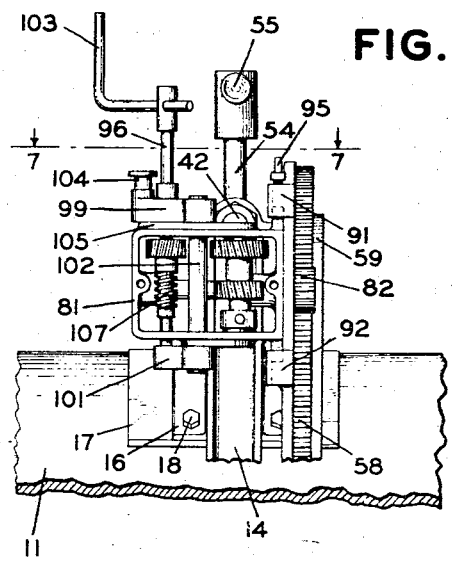
Fig. 6 is a fragmentary plan view showing the operating and transmission mechanism taken along the line 6—6 of Fig. 5.

Referring now to the drawings, Fig. 1 shows the device positioned for use upon a length of pipe 11. The machine comprises a frame 12, having a circular opening 13 in the center thereof, through which the length of pipe may be inserted. The size of the opening 13 naturally determines the maximum size pipe that the device will be able to handle.

In operation, the device is slipped over the end of the length of pipe, and moved along to the point at which the cutting or other operation is to take place. The pipe is then concentrically positioned relative to the opening 13 and firmly held by means of pipe-gripping members in the form of jaws 14 and 15 which are made to close about and grip the outer surface of the pipe. The jaws 14 and 15 are U-shaped in cross-section except at their ends where they terminate in journal blocks (as shown in Figs. 2 and 3), and are slightly V-shaped so as to partially encircle the pipe 11. Fins 16 project outwardly from the forward and rear faces of the jaws 14 and 15 flush with their inner or pipe-engaging sides. The fins 16 are disposed on either side of the center of the jaws and serve as supports for gripping plates 17 attached thereto by means of screws 18. The gripping plates 17 are longer than the depth of the U-shaped jaws and are transversely disposed so that a substantial portion projects outwardly from either side of the jaws. The exposed faces of the plates 17 are the pipe-engaging surfaces, the plates being of sufficient length to provide a sturdy support for the device.

The jaws 14 and 15 are positioned adjacent and forward of the frame 12 and are adapted to be moved longitudinally in a vertical path toward or away from the center of the opening 13 in a plane parallel to the frame 12.

The journal blocks at the ends of each jaw are provided with feet 19 extending the entire length and projecting rearwardly and outwardly therefrom to form toe portions 21, as shown in Fig. 2. The feet 19 slidably engage the forward face of the frame 12 on machined surfaces 22 provided for that purpose.

Raised vertical guide strips 23 and 24 are formed on the forward face of the frame 12 on opposite sides of the opening 13. The bearing surfaces 22 are machined immediately adjacent the inner sides of the raised strips.

Toe plates 25 extend along the top surfaces of the guide strips 23 and 24 removably secured thereto, as by screws 26. The toe plates 25 are wider than the guide strips so that the plates may overhang inwardly to cover the toe portions 21 of the jaws 14 and 15. Thus, the movable jaws are constrained to travel in a vertical path in a plane parallel to the frame 12; the toe plates 25 and the machined surfaces 22 determining the plane of movement and the raised guide strips 23 and 24 limiting transverse movement from the vertical path.

Each of the jaw members 14 and 15 is additionally guided in its plane of movement by feet 27, similar to the feet 19 and parallel thereto, projecting rearwardly from each jaw member at its midpoint. The feet 27 extend across the rear face of each jaw and project outwardly a substantial distance beyond the outer edges of the jaws so that, when the jaws are gripping a pipe length of small diameter, some portion of the feet 27 will remain in sliding engagement with machined surfaces 28 on the frame 12.

Toe plates 29, removably secured to raised supports 31 extending from the opening 13 outwardly across the face of the frame 12, maintain the feet 27 in sliding contact with the frame.

The ends of the jaw members 14 and 15 terminate in journal blocks 32 which are drilled and internally threaded to receive threaded sleeves 33. This is clearly shown in Fig. 3. The sleeves 33 have a hexagonal head 34 formed at one end by which they are screwed into the journal blocks 32. Set screws 35, which pierce the walls of the journal blocks 32, may be made to press against the sleeves to hold them in their set position.

The lower end of frame 12 is irregularly shaped, as shown in Fig. 4, to form supporting surfaces for a pair of removable bearing blocks 36 and 37. Each bearing block comprises two journal bearings 38 and 39 set at right angles to each other and being separated by a webbed reenforcement 41.

The bearings 38 are adapted to rotatively support vertically extending feed screws 42. Each feed screw 42 is doubly reduced at its lower end to form two stepped portions 43 and 44, and two shoulders 45 and 46. The reduced portion 43 is the feed-screw journal and is adapted to rotate freely in the bearing 38. A spacing collar 47 is placed on the journal between the shoulder 45 and the bearing 38. The second reduced portion 44 projects beyond the bearing 38 and is adapted to rigidly support a bevel gear 48. The end of each feed-screw is threaded to receive a retaining nut 49 which holds the bevel gear 48 on the surface 44 and against the shoulder 46.

The portion of each feed-screw 42 projecting above the bearing 38 comprises two threaded sections 51 and 52 of approximately equal length separated by a short unthreaded portion 53. The unthreaded portions 53 are made to align with a horizontal diameter of the circular opening 13.

The upper and lower threaded sections, 51 and 52 respectively, are oppositely threaded, and each section is also oppositely threaded relative to its corresponding section on the opposite feed-screw.

The sleeves 33 are internally threaded to receive the feed-screws 42. The threaded sections 51 receive the ends of the jaw member 14 and the sections 52 receive the jaw member 15. It is obvious that as either feed-screw rotates, the jaw ends carried thereby will approach or recede from each other. By means of these feed-screws the jaws 14 and 15 may be made to move along their vertical path toward or away from the pipe length which has been inserted through the opening 13.

To assemble the jaws 14 and 15 in their proper positions on the feed-screws 42, they are fed thereon from opposite ends while the apparatus is dismantled. Once assembled, the jaws cannot come off because rotations of the feed screws, in the direction causing the jaws to separate, is restrained when the lower jaw 15 reaches the spacing collars 47.

A horizontal shaft 54 is journaled in the bearings 39 and is extended at one end to receive an operating crank or handle 55. A pair of bevel gears 56 are rigidly mounted on the shaft 54 in engagement with the bevel gears 48. The gears 56 are disposed to engage the gears 48 on their inner side nearest the center of the apparatus. Consequently, when the operating handle 55 is turned, the feed-screws will rotate simultaneously in opposite directions. It is because of this that the feed-screws 42 have been oppositely threaded relative to each other. This is the preferred arrangement of my device, although it is contemplated that, by placing the bevel gears 56 in a position to engage the bevel gears 48 on the same side, the feed-screws 42 may be made identical and interchangeable.

It will be noted that the jaws grip the pipe 11 at four places, which are the lines of tangency between the four gripping plates 17 and the surface of the pipe. Since the feed-screws are simultaneously operated to feed the ends of each jaw member at the same rate of speed, it is important to have the gripping plates at all times substantially tangent to a circle concentric with the opening 13. The sleeves 33 may be used to adjust the jaws on the feed-screws to bring about this relationship. By turning the hexagonal head 34 of the sleeve 33 the jaw end may be moved longitudinally in either direction relative to the feed-screw.

The pipe-gripping mechanism, as illustrated, is very easily removed as a unit from the main body of the framework by merely removing the toe plates 25 and 29 from the raised supports and the bearing blocks 36 and 37 from the frame 12.

The frame 12 is extended rearwardly about the circumference of the opening 13 to form an annular shoulder 57, shown in Fig. 1. The tool carrier frame, which comprises a ring gear 58 of thickness equal to the width of the shoulder 57, is loosely mounted on the latter and held thereon by a retaining ring 59 secured to the edge of the shoulder 57 by screws 61.

The tool carrying equipment will be but briefly described inasmuch as it forms no part of invention; it being necessary merely to provide any suitable device, such as that illustrated in the drawings, which is capable of being moved and positioned in the manner required to carry out the various operations for which this apparatus is designed.

Broadly, it comprises a tool, adjustably mounted on a tool carriage, a rack and pinion arrangement for moving the tool carriage relative to the work, and adjustable means for attaching the tool carriage rack to the ring gear to be rotated therewith around the pipe.

Figure 5:
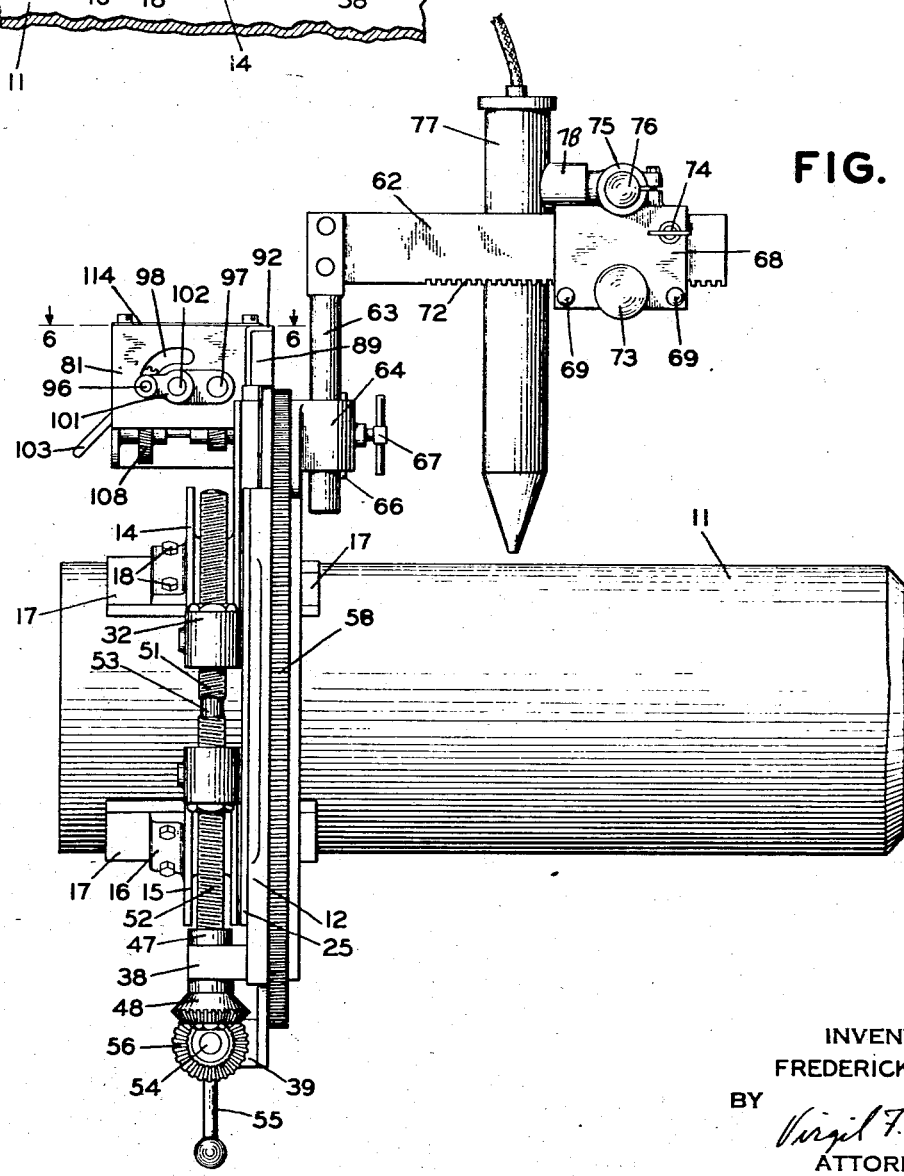
Fig. 5 is a side view showing the machine mounted on a piece of pipe.

Referring to Figs. 4 and 5, the rack member is indicated at 62 extending rearwardly from the frame 12 parallel to the pipe length 11. The rack is secured at its forward end to the upper end of a rod 63 at right angles thereto. A sleeve member 64, adapted to receive the rod 63, is secured to the rear face of the ring gear 58, being disposed parallel to and slightly to one side of a diameter of the ring gear. The rod 63 is longitudinally slotted at 65 along its entire length to slidably receive a complementary key 66 secured to the inner surface of the sleeve. The rod is thus prevented from rotating in the sleeve, but is free to slide up or down to provide radial adjustment of the rack member 62 relative to the pipe 11. A hand screw 67 pierces the sleeve and is engageable with the rod 63 to hold the same against longitudinal movement therein.

The upper edge of the rack 62 is machined to provide a runway for a sliding tool carriage 68. The tool carriage 68 has an inverted U shape and is placed in straddling position on the rack. The sides of the carriage extend below the lower edge of the rack, and are reenforced by spacers 69 at the lower corners.

The carriage 68 is moved along the rack member 62 by means of a pinion 71 in engagement with rack teeth 72 cut along the lower edge of the rack member. The pinion 71 is journaled in the sides of the carriage 68, one of the journals being extended to receive a hand operated knob or disc 73.

A hand screw 74, mounted in the side of the carriage 68 may be used to bear against the side of the rack member in order to hold the carriage in a fixed position.

A split sleeve clamp 75, mounted on the top of the carriage 68, is adapted to adjustably hold a bar 76 at right angles to the sides of the carriage. The tool 77, which in the present illustration is a gaseous discharge cutting torch, has a laterally extending arm 78 secured at its outer end to the end of bar 76, as by a screw 79.

It will be observed that the tool carrying mechanism just described permits numerous adjustments through its various clamping arrangements and joints. It is thus possible to position the working tool at practically any angle relative to the pipe surface. In addition to the angular adjustment, radial and longitudinal movement relative to the pipe is obtainable.

The mechanism for rotating the carrier frame about the pipe as an axis is a self-contained unit comprising an operating or actuating element, a driving member to cooperate with the carrier frame and a gear transmission housing 81 which is adjustably connected to the forward face of the frame which is shaped at its upper left corner to receive the same.

The ring gear 58 is rotated on its shoulder 57 by a driving gear 82 secured to the free projecting end of a driving shaft 83 suitably journaled at 84 and 85 in the forward and rear walls of the transmission housing 81. The free end of the shaft 83 extends rearwardly from the housing and projects through an opening 86 in the frame 12 large enough to permit the gear 82 to pass through, in order that the shaft may be withdrawn without removing the gear from the shaft.

The transmission housing 81 has its rear, or frame engaging, face extended outwardly on either side to form flanges 87 and 88 which slide in a vertical path determined by the vertical raised guide strip 23, which is extended upwardly along the entire length of the frame, and a shorter raised guide strip 89 spaced inwardly from the strip 23 and running parallel thereto. The rear face of the transmission housing is maintained in sliding engagement with the face of the frame 12 by means of toe plates 91 and 92 overlapping the flanges 87 and 88 and secured to the raised guide strips by screws 93. The toe plates 91 and 92 extend upwardly to the top of the frame 12, where they are bent backwardly to seal the flanges in their guide channels. The flanges 87 and 88 do not extend along the entire edges of the housing, but terminate below the top to provide a gap 94 between the upper end of the flanges and the turned over portion of the toe plates 91 and 92, of sufficient size to permit the housing 81 to slide upwardly along its guideway until the driving gear 82 is disengaged from the ring gear 58.

Free vertical movement of the transmission housing is restrained by means of a hand-screw 95 which passes through the side of guide strip 23 to engage the edge of the flange 87. By tightening the hand-screw 95 the gear box may be securely clamped in its engaging or disengaging position.

The transmission mechanism comprises a system of gearing which provides two gear ratios for rotating the carrier frame about the workpiece. The transmission mechanism includes an operating shaft 96 and a countershaft 97 in constant rotative engagement therewith, in addition to the driving shaft 83 which carries the driving gear 82.

The operating shaft 96 extends horizontally parallel to the frame 12 through a pair of arcuate slots 98 formed in the sides of the transmission housing 81, and is journaled in the free ends of levers 99 and 101 which are pivotally mounted outside the housing on the projecting ends of a pivot rod 102 extending through the housing. The operating shaft 96 extends beyond its journal in the lever 99 to connect with suitable rotating means, such as the hand crank 103.

Lever 99 extends outwardly at its free end beyond the bearing for the operating shaft 96 to provide means by which the lever may be grasped to move the operating shaft transversely to various positions in the arcuate slots 98. The outer free end of the lever 99 is transversely drilled to receive a spring and plunger 104, the outer end of which is button-shaped to permit the plunger to be grasped and pulled outwardly against the action of its internal spring, not shown in the drawings. A raised arcuate strip 105, is formed on the outer surface of the gear housing along the path described by the free end of lever 99. Holes 106 are drilled at suitable points in the surface of the raised strip 105 to receive the inner end of the plunger and thus hold the lever 99 and the operating shaft 96 rigidly.

The holes 106, of which there are three, are drilled so as to receive the plunger 104 when the operating shaft is in either of its limiting positions at the ends of the slots 98 or when it is in a middle position. When the plunger 104 is in the lowermost hole so that the levers 99 and 101 are in a horizontal position, the transmission mechanism is set for slow feed of the carrier frame. The operating shaft 96 and the driving shaft 83 are then directly connected through a worm 107 rigidly mounted on the former, and a worm-gear 108 rigidly mounted on the latter. The gear ratio is such that with normal operation of the hand-crank 103, the tool carrier frame will rotate slowly about the pipe 11.

The middle hole 106 is the neutral position in which the operating shaft is free to rotate independently of either the driving shaft 83 or the countershaft 97. In this position the carrier frame may be rotated by hand against the dragging action caused by the countershaft 97, which continues to rotate due to the fixed connection between the ring gear 58 and the driving gear 82.

When the operating shaft 96 is moved to its uppermost position with the plunger 102 in the top hole and the levers 99 and 101 pointing upwardly, the countershaft 97 will be in rotative engagement with the operating shaft through gears 109 and 111. A gear 112, secured to the countershaft, constantly meshes with a gear 113 on the driving shaft so that the two shafts will rotate together. The gear ratio between the two, however, is lower than the ratio between the worm 107 and the worm-gear 108 so that with this gear arrangement the carrier frame may be made to rotate more rapidly.

The two-speed transmission enables the operator to rotate the carrier frame through a wide range. However, it is often desirable to test the machine to see that it is properly mounted on the pipe. For this purpose, the machine may be used as a scriber and the carrier frame rotated rapidly to determine whether the tool is rotating in a plane at right angles to the pipe. To speed up this operation, the entire gear transmission housing may be moved upwardly by releasing the pressure of the hand screw 95, to disengage the driving gear 82 from the ring gear 58. The carrier frame will then rotate freely.

A cover plate 114 is removably secured to the top of the housing 81 by machine screws, a pair of lugs 115 formed on the front and rear inner walls of the transmission housing being drilled and tapped to receive the same.

For certain types of work it may be desirable to cut out sections of pipe, as by slotting, or to perform a plurality of operations at different predetermined points about the pipe's surface. In order to accurately position the tool post at any of these points I have provided a scale 116 for measuring the angle of rotation of the carrier frame.

The scale 116 is made by marking off in degrees, as with notches, the face of the stationary retaining ring 59. A pair of notches, or indicators, 117 are placed on the face of the ring gear 58 on a diameter parallel to the center line of the sleeve 64 so that the angular displacement will be measured from the vertical position. With this arrangement the tool may be rotated about the workpiece through any desired angle. This is especially helpful in cases where a pipe is to be cut or drilled at different points about its periphery, or where a flange is to be drilled, or otherwise operated upon.

From the foregoing, it will be observed that I have provided a portable machine or device of light but sturdy construction positionable upon a piece of pipe for performing a wide variety of operations. The machine is not limited in its use to the carrying of a cutting torch, as illustrated, but may be used to carry many types of tools, such as an electric grinding machine for treating pipe ends or surfaces, or an electric drill. The several adjusting devices permit the tool to be positioned at any angle relative to the pipe so that chamfering, or cutting at an angle to the surface, may be readily accomplished.

While I have shown my invention in but one form, it will be obvious to those skilled in the art that it is not so limited but is susceptible to various changes and modifications without departing from the spirit thereof, and it is desired therefore that only such limitations shall be placed thereon as are imposed by the prior art or are specifically set forth in the appended claims.

I claim:

1. In a pipe-working machine having a pipe encircling frame, a circular tool carrier rotatably mounted on said frame and adapted to carry a tool about the pipe to be worked upon, and means for rotating said tool carrier; means for gripping the pipe and centering it relative to said tool carrier comprising, a pair of jaws oppositely disposed on said encircling frame and adapted to slide inwardly along guides formed thereon, stationary screws rotatably mounted on said frame and adapted to feed the jaws inwardly along their guides toward the pipe, and adjustable internally-externally threaded members set in said jaws and adapted to receive the threaded portions of said screws, whereby said jaws are independently movable relative to said screws.

2. In a pipe-working machine having a pipe encircling frame, a circular tool carrier rotatably mounted on said frame and adapted to carry a tool about the pipe to be worked upon, and means for rotating said tool carrier; means for gripping the pipe and centering it relative to said tool carrier comprising, a pair of jaws oppositely disposed on said frame and adapted to slide inwardly along guides formed thereon, stationary screws rotatably mounted on said frame and adapted to feed the jaws along said guides, means for simultaneously and uniformly actuating said screws, and adjustable internally-externally threaded members set in said jaws and adapted to receive the threaded portions of said screws, said members providing independent movement of said jaws relative to said screws.

3. In a pipe-working machine including, a frame having an opening adapted to receive a pipe to be worked upon, a ring gear rotatably mounted on said frame and adapted to carry a tool about the pipe, and means for rotating said ring gear; means for gripping the pipe and centering it relative to said ring gear comprising a pair of jaws spanning said opening and adapted to oppositely engage the pipe, said jaws being movable in guides formed on said frame, a pair of feed-screws rotatably mounted on opposite sides of said opening parallel to said guides, each of said feed-screws having oppositely threaded portions extending through the ends of said jaws and cooperating therewith to feed the jaws toward the pipe, a crankshaft disposed across the ends of said feed screws adapted to simultaneously and uniformly actuate the latter, and internally-externally threaded adjustable sleeves set in the end of each jaw and adapted to receive the feed screws, said sleeves providing for independent movement of said jaws relative to said screws, whereby said jaws may be adjusted after assembling to position the pipe gripping portions of the jaws tangent to a circle concentric to said ring gear.

4. In a pipe-working machine having a pipe-encircling frame, a circular tool carrier rotatably mounted on said frame adapted to carry a tool about the pipe to be worked upon, and means for rotating said tool carrier; means for gripping the pipe and centering it relative to said tool carrier comprising, a plurality of pipe-engaging elements slidably mounted in guides on said frame, simultaneously operable feed screws on said frame, and rotatable members intermediate said elements and said feed screws, said members being normally fixed relative to said elements and, when rotated, forming individual auxiliary feed means for said elements.

FREDERICK G. KUGEL.